US006999752B2

(12) United States Patent
Fukaya

(10) Patent No.: US 6,999,752 B2
(45) Date of Patent: Feb. 14, 2006

(54) PORTABLE TELEPHONE AND MUSIC REPRODUCING METHOD

(75) Inventor: Kazunari Fukaya, Iwata (JP)

(73) Assignee: Yamaha Corporation, Hamamatsu (JP)

( * ) Notice: Subject to any disclaimer, the term of this patent is extended or adjusted under 35 U.S.C. 154(b) by 328 days.

(21) Appl. No.: 10/203,231

(22) PCT Filed: Feb. 9, 2001

(86) PCT No.: PCT/JP01/00909

§ 371 (c)(1),
(2), (4) Date: Aug. 7, 2002

(87) PCT Pub. No.: WO01/59754

PCT Pub. Date: Aug. 16, 2001

(65) Prior Publication Data

US 2003/0013432 A1 Jan. 16, 2003

(30) Foreign Application Priority Data

Feb. 9, 2000 (JP) ............................... 2000-32472

(51) Int. Cl.
*H04Q 7/20* (2006.01)

(52) U.S. Cl. ............................... 455/412.1; 455/412.2; 455/414.1; 455/414.4; 455/567; 455/550.1; 379/67.1; 379/88.28; 370/259; 370/271

(58) Field of Classification Search ................ 455/567, 455/456, 412.1, 186.1, 67.11, 412.2, 414.1, 455/414.4, 550.1; 379/88.11, 67.1, 88.28; 369/275.2; 370/259, 271
See application file for complete search history.

(56) References Cited

U.S. PATENT DOCUMENTS

| | | | | |
|---|---|---|---|---|
| 5,296,642 | A * | 3/1994 | Konishi | 84/609 |
| 5,321,739 | A * | 6/1994 | Higashiyama | 455/412.1 |
| 5,572,576 | A * | 11/1996 | Klausner et al. | 379/88.11 |
| 5,710,978 | A * | 1/1998 | Swift | 455/67.11 |
| 5,737,308 | A * | 4/1998 | Nakai et al. | 369/275.2 |
| 6,075,998 | A * | 6/2000 | Morishima | 455/567 |
| 6,094,587 | A * | 7/2000 | Armanto et al. | 455/567 |
| 6,097,935 | A * | 8/2000 | Takahashi et al. | 455/186.1 |
| 6,456,841 | B1 * | 9/2002 | Tomimori | 455/412.2 |
| 6,501,967 | B1 * | 12/2002 | Makela et al. | 455/567 |
| 2001/0041600 | A1 * | 11/2001 | Becker et al. | 455/567 |
| 2003/0060211 | A1 * | 3/2003 | Chern et al. | 455/456 |

FOREIGN PATENT DOCUMENTS

| | | |
|---|---|---|
| CN | 96123141.6 | 9/1997 |
| JP | HEI 9-54581 | 2/1997 |

(Continued)

*Primary Examiner*—Sonny Trinh
*Assistant Examiner*—Khai Nguyen
(74) *Attorney, Agent, or Firm*—Pillsbury Winthrop Shaw Pittman LLP

(57) ABSTRACT

A portable telephone having music playback functions has a first storage for storing music data of plural musical tunes and a second storage (namely, a cache memory) for storing at least one musical tune to be reproduced. A musical tune that may be likely to be reproduced is selected from among plural musical tunes in accordance with prescribed rules, so that the music data of the selected musical tune are precedently transferred from the first storage to the second storage to enable smooth reproduction in response to an incoming call whose telephone number specifies the selected musical tune.

20 Claims, 8 Drawing Sheets

FOREIGN PATENT DOCUMENTS

| | | |
|---|---|---|
| JP | HEI 11-15483 | 1/1999 |
| JP | HEI 11-126084 | 5/1999 |
| JP | HEI 11-331404 | 11/1999 |
| JP | 2001-051678 | 2/2001 |
| JP | 2001-109472 | 4/2001 |
| WO | WO 99/43136 | 8/1999 |

* cited by examiner

FIG. 3

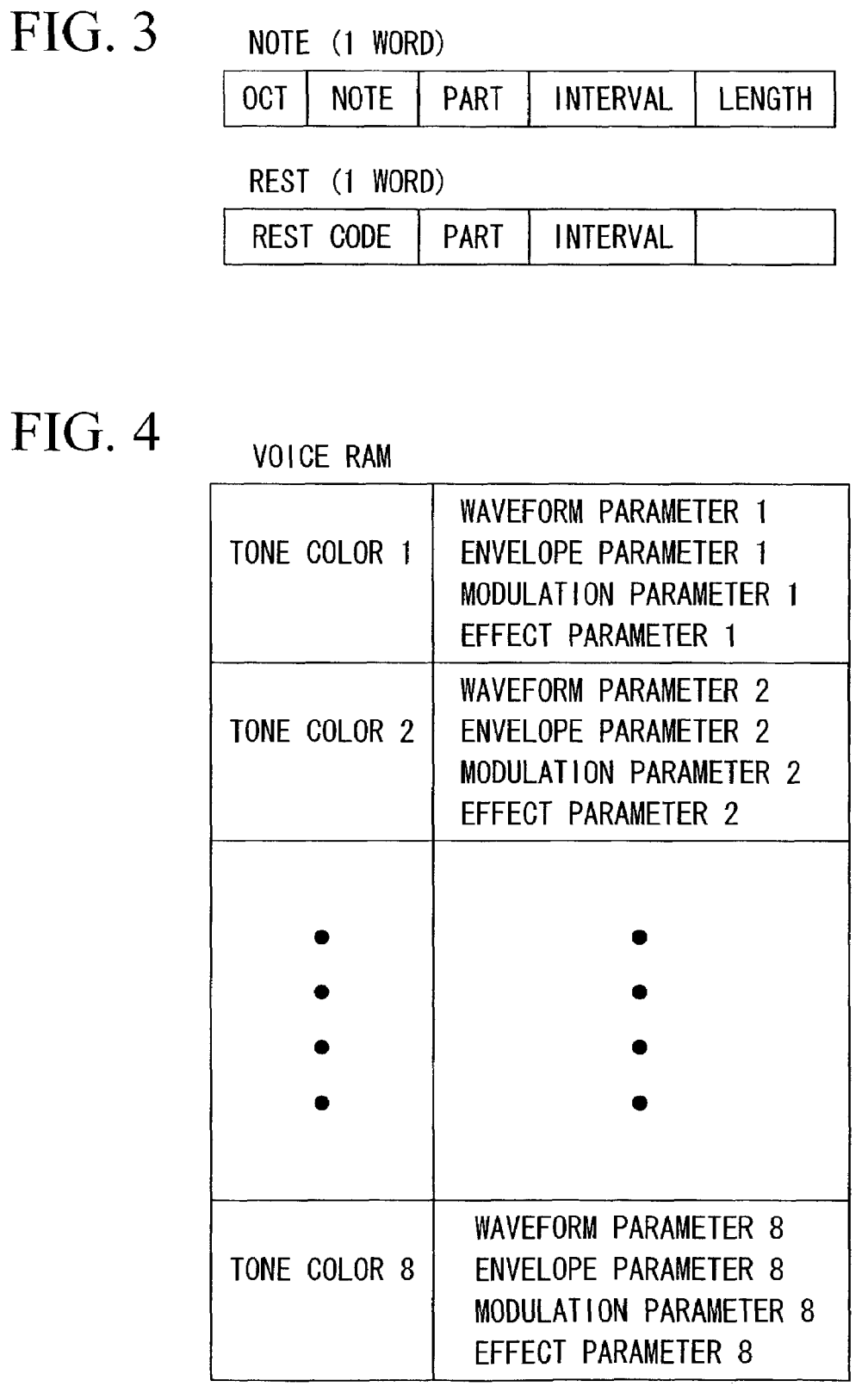

NOTE (1 WORD)

| OCT | NOTE | PART | INTERVAL | LENGTH |
|---|---|---|---|---|

REST (1 WORD)

| REST CODE | PART | INTERVAL | |
|---|---|---|---|

FIG. 4

VOICE RAM

| | |
|---|---|
| TONE COLOR 1 | WAVEFORM PARAMETER 1<br>ENVELOPE PARAMETER 1<br>MODULATION PARAMETER 1<br>EFFECT PARAMETER 1 |
| TONE COLOR 2 | WAVEFORM PARAMETER 2<br>ENVELOPE PARAMETER 2<br>MODULATION PARAMETER 2<br>EFFECT PARAMETER 2 |
| •<br>•<br>•<br>• | •<br>•<br>•<br>• |
| TONE COLOR 8 | WAVEFORM PARAMETER 8<br>ENVELOPE PARAMETER 8<br>MODULATION PARAMETER 8<br>EFFECT PARAMETER 8 |

FIG. 5

TONE COLOR ASSIGNMENT DATA

| | | | |
|---|---|---|---|
| PART 1 →TONE COLOR 1 | PART 2 →TONE COLOR 5 | PART 3 →TONE COLOR 8 | PART 4 →TONE COLOR 2 |

PORTABLE TELEPHONE AND MUSIC REPRODUCING METHOD

This application is the National Phase of International Application PCT/JP01/00909 filed 9 Feb. 2001 which designated the U.S. and that International Application was not published under PCT Article 21(2) in English.

TECHNICAL FIELD

This invention relates to portable telephones that produce melody sounds to notify users or subscribers of reception of incoming calls from calling parties, and in particular to music playback methods for playing back musical tones on portable telephones.

BACKGROUND ART

Conventionally, recent telecommunication technologies provide a variety of systems of portable telephones such as cellular phone systems, which are mainly classified into analog cellular systems and digital cellular systems known as 'PDC' (Personal Digital Cellular telecommunication system), and 'PHS' (Personal Handyphone System). At reception of incoming calls, portable telephones produce incoming call sounds to notify users of reception of incoming calls. As incoming call sounds, portable telephones conventionally produce beep sounds, which may be offensive to ears of users. Hence, recent portable telephones produce melody sounds, which are substituted for beep sounds, as incoming call sounds.

The aforementioned portable telephones may be capable of merely reproducing simple melody lines, which may not be satisfactory in sound quality.

In order to cope with the aforementioned disadvantage, engineers have made propositions that music playback devices having automatic performance functions would be installed in portable telephones. That is, a music playback device, which is applied to a portable telephone to realize an automatic performance function, is constituted by a central processing unit (CPU), a read-only memory (ROM), a random-access memory (RAM), and a sound source, for example. Herein, the CPU runs automatic performance programs stored in the ROM, so that music data representing the melody and rhythm of a prescribed musical tune are read from the ROM or RAM while tone-generation parameters are adequately set to the sound source. Thus, the music playback device reproduces the melody of the musical tune.

Recently, engineers have developed so-called 'melody ICs' that are designed to reproduce melodies. An example of the melody IC comprises a sound source, a sequencer, and a ROM for storing musical score data. Upon receipt of reproduction instructions from the external device, the melody IC reproduces a melody of a prescribed musical tune based on musical score data stored in the ROM. When a melody IC is installed in a portable telephone, the CPU is reduced in processing load because it is not required to perform a music playback process. For this reason, the portable telephone can be designed using the low-cost and low-speed CPU for processing thereof.

In the aforementioned music playback device comprising a CPU, a ROM, a RAM, and a sound source, the CPU performs a so-called sequencer process in which music data are translated to adequately set tone-generation parameters to the sound source. For this reason, the CPU is increased in processing load. In addition, the portable telephone using the music playback device cannot be designed using an inexpensive CPU which cannot not bear increasing loads in processing.

The portable telephone using the melody IC is advantageous because the CPU is not increased in processing load. However, it has a problem due to limitation in 'reproducible' musical tunes.

To cope with the aforementioned disadvantages, the present applicant has filed two patent applications in Japan, namely Japanese Patent Application No. Hei 11-222319 and Japanese Patent Application No. Hei 11-309408. Those patent applications provide music playback devices that are applicable to portable telephones to allow reproduction of a variety of musical tunes with the low cost.

The portable telephones using the aforementioned music playback devices reproduce musical tunes by hardware elements, e.g., FIFO (First-In-First-Out) memories. That is, music data of a reproduced melody is specified upon issuance of a trigger in response to an incoming call and is then transferred to the FIFO memory. Hence, there occurs a small time delay between the trigger for initiating reproduction of the melody and reproduction timings of actually reproducing melody sound.

It is an object of the invention to provide a portable telephone and a music playback method by which an unwanted time delay is reduced between a trigger for specifying music data whose melody is to be reproduced and reproduction timings of actually reproducing melody sound.

DISCLOSURE OF INVENTION

This invention provides a music playback method applicable to a portable telephone that has a music playback function for reproducing a melody of a musical tune as incoming call sound or hold sound. Herein, the portable telephone has a first storage for storing music data of plural musical tunes and a second storage (i.e., cache memory) for storing at least one musical tune to be reproduced, wherein the musical tunes are listed in advance in connection with telephone numbers of calling parties who may be likely to call the user of the portable telephone. Prescribed rules are described to select a musical tune that is likely to be reproduced from among plural musical tunes on the first storage, so that the music data of the selected musical tune are precedently transferred from the first storage to the second storage. When the telephone number regarding an incoming call specifies the musical tune precedently written to the second storage, musical tone signals are directly reproduced based on the music data of the second storage. When the telephone number regarding an incoming call specifies a musical tune that differs from the selected musical tune, the music data of the specified musical tune are automatically transferred from the first storage to the second storage while the music data precedently written to the second storage are instantaneously erased.

Because the musical tune that is likely to be reproduced is precedently cached in the cache memory so that musical tone signals can be directly reproduced without interruption in a cache hit event, it is possible to remarkably reduce a time lag between a triggering timing in reproduction of a melody and a reproduction timing of actually reproducing the melody.

Incidentally, the first storage is constituted by a RAM or ROM, while the second storage is constituted by an FIFO memory exclusively used for storing musical score data and a Voice RAM exclusively used for storing tone color data for multiple parts of the musical tune.

BRIEF DESCRIPTION OF DRAWINGS

FIG. 3 shows an example of music data containing notes and rest symbols that are used for playback of a musical tune on the portable telephone;

FIG. 4 shows an example of the content of tone color data stored in a Voice RAM shown in FIG. 2;

FIG. 5 shows an example of the configuration of tone color assignment data representing assignment of tone colors to multiple parts of the musical tune to be played back;

BEST MODE FOR CARRYING OUT THE INVENTION

This invention will be described in further detail by way of examples with reference to the accompanying drawings.

Figure 1:
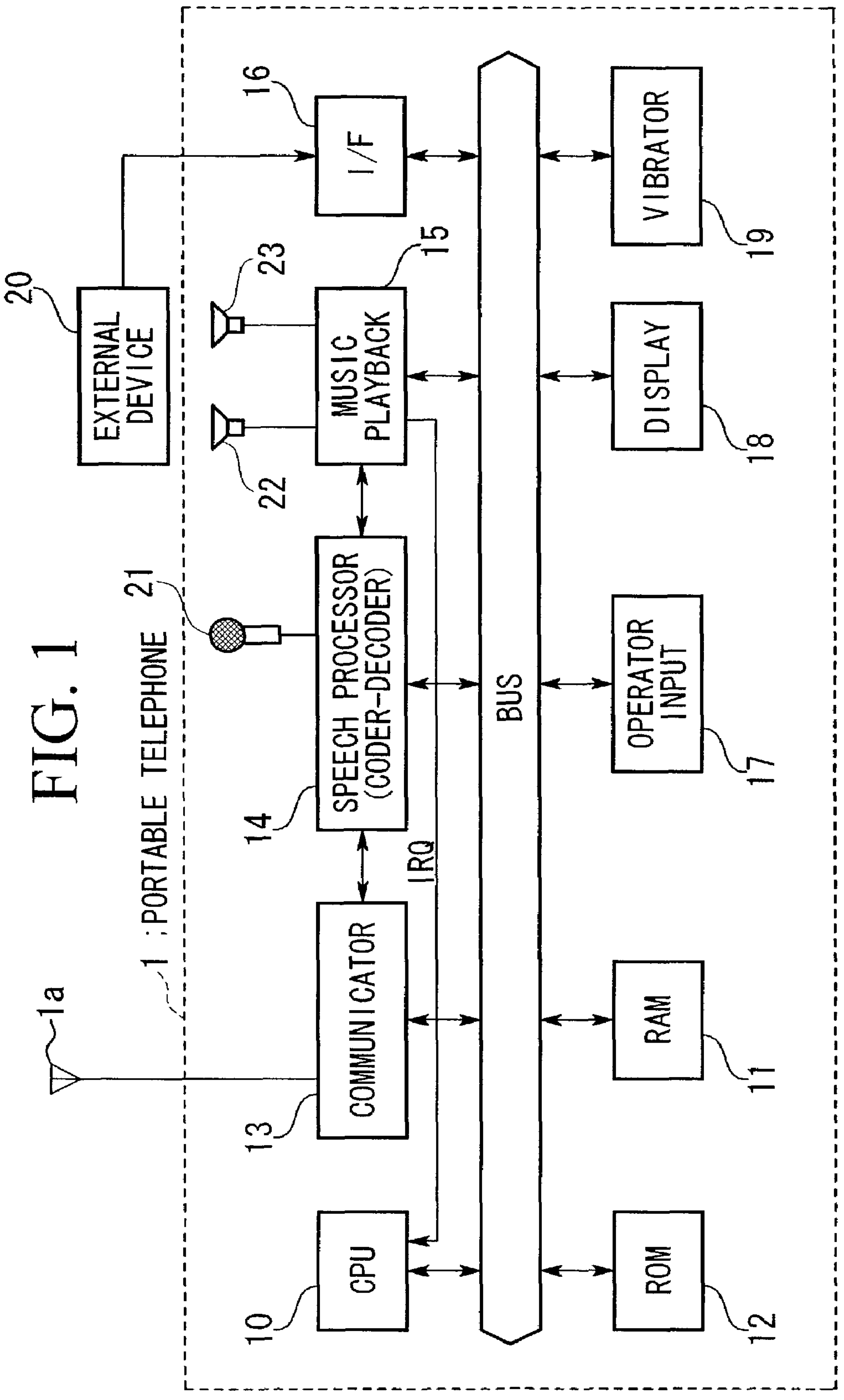
FIG. 1 is a block diagram showing an electric configuration of a portable telephone having a music playback function in accordance with a preferred embodiment of the invention.

FIG. 1 shows an electric configuration of a portable telephone having a music playback function in accordance with the preferred embodiment of the invention. In FIG. 1, a communicator 13 having modulation-demodulation functions is connected with a retractable antenna 1*a*. A central processing unit (CPU) 10 runs telephone function programs to perform overall controls on various parts and sections of the system of the portable telephone 1. The system CPU 10 has a timer (not shown) that indicates a lapse of time in operation and causes timer interruption in each specific time interval.

Upon receipt of an interrupt request signal (IRQ), the system CPU 10 performs processes for assisting a music playback process, details of which will be described later. A system RAM 11 contains various areas, that is, a music data storage area, a user setup data storage area, and a work area used for the system CPU 10. Herein, the music data storage area is used to store music data containing musical score data and tone color data that the portable telephone 1 downloads from the prescribed music download center by way of base stations and/or networks, for example.

The user setup data storage area of the system RAM 11 stores musical tune specifying data for specifying a musical tune whose melody is to be played back by a music playback section 15 in an incoming call reception mode, a hold mode, and a music playback mode in connection with telephone numbers of calling parties. That is, the user setup data storage area stores a table showing the correspondence between musical tune specifying data and telephone numbers of calling parties. Hence, the user of the portable telephone 1 is able to arbitrarily set the content of the table stored in the user setup data storage area. In addition, the system RAM 11 also stores playback frequency data representing a playback frequency by which musical tunes are played back by the music playback section 15 in response to incoming calls in the past. Such playback frequency data are updated as necessary. Further, the system RAM 11 stores various kinds of setup data set by user's operations on an operator input section 17.

A system ROM 12 stores a variety of telephone function programs that are executed by the CPU 10 for transmission and reception of calls. In addition, the system ROM 12 stores programs regarding processes for assisting music playback processes and various types of fixed data such as preset musical score data and tone color data. The system RAM 11 and/or the system ROM 12 is used as a first storage of this invention.

A communicator 13 demodulates signals received by an antenna 1*a*, and it also modulates signals which are to be transmitted by the antenna 1*a*. That is, incoming call signals are demodulated by the communicator 13 and are then decoded by a speech processor (coder-decoder) 14. In addition, a microphone 21 picks up and converts the speech of the user of the portable telephone 1 to speech signals, which are then subjected to compressive coding by the speech processor 14.

The speech processor 14 performs high-efficiency compressive coding/decoding on speech signals corresponding to the user's speech for transmission. That is, the speech processor 14 is designed as a coder-decoder based on the code excited linear predictive coding (CELPC) system or adaptive differential pulse-code modulation (ADPCM) system, for example. A music playback section 15 sends the speech signals given from the speech processor 14 to a speaker 22 to reproduce speech that is transmitted to the portable telephone 1. In addition, the music playback section 15 reproduces music data to play back a melody of a musical tune as incoming call sound or hold sound. Herein, the incoming call sound is produced by a speaker 23 to notify the user of the portable telephone 1 of reception of an incoming call. The hold sound is mixed with speech signals and is produced by the speaker 22. In addition, the hold sound is forwarded to the speech processor 14 and the communicator 13, by which it is transmitted to a telephone terminal of a person who is now communicating with the user of the portable telephone 1.

The music playback section 15 has an internal storage that stores a prescribed amount of musical score data for playback of a musical tune. If a prescribed size of a vacant area emerges within the internal storage of the music playback section 15 that presently proceeds to reproduction of music data, the music playback section 15 supplies an interrupt request signal (IRQ) to the system CPU 10, which in turn accesses the system RAM 11 or system ROM 12 to read remaining parts of the musical score data following the prescribed amount of musical score data that were precedently stored in the internal storage, so that remaining parts of the musical score data are sequentially transferred to the music playback section 15.

An interface (I/F) 16 is used to download from an external device 20 such as a personal computer the music data comprising the musical score data and tone color data. An operator input section 17 contains numeric keys representing numerals '0' to '9' and other types of keys, all of which are arranged on the portable telephone 1.

A display 18 displays on the screen thereof menus for telephone functions and other information data instructed by operations of numeric keys (or dial buttons) and other keys. A vibrator 19 generates vibration that is substituted for incoming call sound rung by the portable telephone 1. That is, the body of the portable telephone 1 is vibrated by the vibrator 19 in response to an incoming call, by which the user is notified of reception of the incoming call. Incidentally, all blocks and sections of the portable telephone 1 are interconnected together by way of a bus 24, which is used to send and receive data and instructions.

Figure 2:
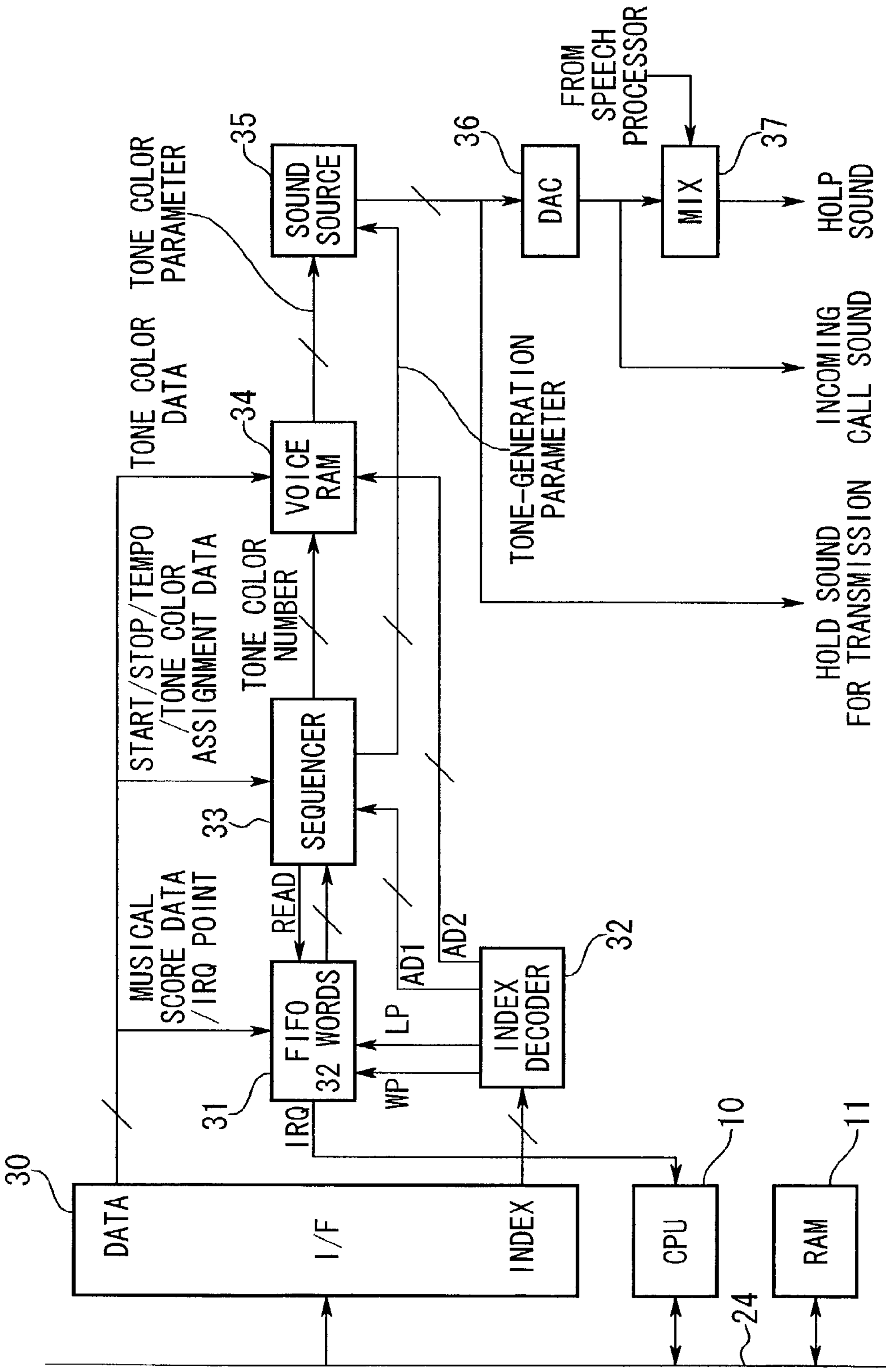
FIG. 2 is a block diagram showing an internal configuration of a music playback section shown in FIG. 1.

Next, a description will be given with respect to an internal configuration of the music playback section 15 in detail with reference to FIG. 2. The music playback section 15 shown in FIG. 2 is constituted by an interface (I/F) 30, an FIFO memory 31 for storing musical score data, an INDEX decoder 32, a sequencer 33, a Voice RAM 34 for storing tone color data, a sound source 35 for generating musical tone signals, a digital-to-analog converter (DAC) 36, and a mixer (MIX) 37 that mixes together the output of the digital-to-analog converter 36 and the output of the speech processor 14 shown in FIG. 1. The FIFO memory 31 and the Voice RAM 34 are used as a second storage of this invention.

The music playback section 15 receives various data from the bus 24 by means of the interface 30. By the interface 30, contents of data (DATA, namely musical score data and tone color data) are separated from index data (INDEX) showing indications of received data, so that the data are output via an output terminal 'DATA' while the index data are output via an output terminal 'INDEX'.

The FIFO memory 31 corresponds to the foregoing internal storage of the music playback section 15, wherein it stores thirty-two words of data, for example. That is, the musical score data are sequentially read from the FIFO memory 31 in a first-in-first-out manner in which data input first is output first. During a reading process of the musical score data from the FIFO memory 31, when the prescribed size of a vacant area emerges, the FIFO memory 31 sends an interrupt request signal (IRQ) to the system CPU 10.

The INDEX decoder 32 encodes the index data to produce write pulses (WP) and latch pulses (LP), details of which will be described later. These pulses are supplied to the FIFO memory 31. In addition, the INDEX decoder 32 also supplies to the sequencer 33 index data AD1 showing an indication of an event in which the interface 30 outputs via the output terminal DATA the prescribed data which should be received by the sequencer 33. Further, the INDEX decoder 32 supplies to the Voice RAM 34 index data AD2 showing an indication of an event in which the interface 30 outputs via the output terminal DATA the prescribed data which should be received by the Voice RAM 34.

The sequencer 33 applies read pulses (Read) to the FIFO memory 31 to sequentially read the musical score data. In addition, the sequencer 33 sets prescribed tone-generation parameters to the sound source 35 in response to time data contained in the musical score data. Further, the sequencer 33 inputs tone color assignment data from the output terminal DATA of the interface 30, so that the sequencer 33 supplies to the Voice RAM 34 tone color numbers which are designated by the tone color assignment data with regard to respective parts of the musical tune. Thus, the sequencer 33 reads from the Voice RAM 34 tone color parameters corresponding to the tone color numbers, which are set to the sound source 35.

The Voice RAM 34 is exclusively used to store tone color data, which are output from the output terminal DATA of the interface 30. That is, the Voice RAM 34 has a storage capacity that is capable of storing the tone color data of eight tone colors, for example.

The FIFO memory 31 and Voice RAM 34 are designed based on prescribed rules for selection of musical tunes, by which music data of a musical tune whose use frequency is highest in the past is to be selected first, for example. Based on these rules, certain music data are selected from among all music data stored in the system RAM 11 or system ROM 12 by the prediction such that they may be likely provided for the reproduction next time. The selected (or predicted) music data are subjected to cache (or precedent write operation).

Within the predicted music data that may be likely provided for the reproduction next time, a part of musical score data is transferred to the FIFO memory 31 from the system RAM 11 or system ROM 12, while tone color data are transferred to the Voice RAM 34. Thus, a part of the musical score data is written in advance to the FIFO memory 31, while the tone color data are written in advance to the Voice RAM 34.

As described above, the present embodiment is designed such that only a part of the music data which should be precedently written in the storage is transferred to the FIFO memory 31 which is used as the second storage of this invention and which is limited in storage capacity. Of course, the present embodiment can be easily modified to employ a memory having a large storage capacity. In this case, all the music data that should be precedently written in the storage can be collectively transferred to such a memory at once; then, the music data are sequentially read from the memory and are supplied to the sound source 35.

The sound source 35 is capable of simultaneously generating musical tone signals of four parts, for example. The prescribed tone colors whose data are respectively read from the Voice RAM 34 in accordance with the tone color assignment data are set to these parts. Thus, the sound source 35 generates musical tone signals having tone pitches and tone lengths, which are designated by tone-generation parameters given from the sequencer 33, with respect to each of the parts. The musical tone signals of four parts are supplied to the digital-to-analog converter 36, by which they are converted to analog musical tone signals in conformity with prescribed reproduction timings. Then, the mixer 37 mixes together the analog musical tone signals and the aforementioned speech signals that are decoded by the speech processor 14.

Next, a description will be given with respect to operations of the music playback section 15 shown in FIG. 2. In a music playback mode, the display 18 shows musical tune information for listing plural musical tunes on the screen. From the musical tune information, the user of the portable telephone 1 selects one of the musical tunes listed on the screen of the display 18. Then, the music data of the selected musical tune is read from the system RAM 11 and are sent to the music playback section 15 via the bus 24. That is, the interface 30 of the music playback section 15 inputs music data that contain tone color data of eight tone colors and index data. The INDEX decoder 32 decodes the index data accompanied with the tone color data to produce index data AD2, which are forwarded to the Voice RAM 34. FIG. 4 shows an example of the content of the tone color data of eight tone colors which are written to the Voice RAM 34.

In FIG. 4, the Voice RAM 34 stores four types of data, namely a waveform parameter, an envelope parameter, a modulation parameter, and an effect parameter, with respect to each of eight tone colors, namely 'tone color 1' to 'tone color 8' which correspond to tone color numbers. Herein, the eight tone colors each have specific parameters. Specifically, waveform parameters designate musical tone waveforms. When the sound source 35 is constituted as a PCM sound source having a waveform table for listing multiple waveforms, the waveform parameter designates any one of the waveforms listed on the waveform table. When the sound source 35 is constituted as an FM sound source, the waveform parameter designates an algorithm for calculations of frequency modulation.

The envelope parameter designates an attack rate, a decay rate, a sustain level, and a release rate. The modulation parameter designates velocity such as the depth of vibrato or tremolo. The effect parameter designates effects in music such as reverb, chorus and variation.

The music data input to the interface 30 contain tempo data (Tempo) and tone color assignment data having index data as well. The INDEX decoder 32 decodes the tempo data and the index data accompanied with the tone color assignment data to produce index data AD1, which is forwarded to the sequencer 33.

The sequencer 33 accesses the Voice RAM 34 to read tone color parameters, which are designated by the tone color assignment data. The tone color parameters are forwarded to the sound source 35. FIG. 5 shows an example of a configuration of the tone color assignment data. As shown in FIG. 5, there are provided four parts, namely 'part 1' to 'part 4' to which the tone color numbers are adequately assigned. This realizes assignment of prescribed tone colors to the four parts. By supplying the tone color number of the prescribed part to the Voice RAM 34, the sequencer 33 reads the corresponding tone color parameter from the Voice RAM 34. Thus, it is possible to adequately set the tone colors of the four parts to the sound source 35.

Incidentally, the tone color data of the reproduced music data are transferred and written to the Voice RAM 34, which has a storage capacity of storing at least eight tone colors of tone color data in accordance with the present embodiment. That is, even though the Voice RAM 34 has a relatively small storage capacity, it is capable of storing all the tone color data that are required for the reproduction of the music data. By the way, the present embodiment allows the user to edit the tempo data.

The music data input by the interface 30 contain musical score data accompanied with index data, which the INDEX decoder 32 decodes to supply write pulses (WP) to the FIFO memory 31. Thus, the musical score data of thirty-two words are written to the FIFO memory 31. Incidentally, the thirty-two words represent only a part of the musical score data corresponding to a single musical tune. Hence, the FIFO memory 31 initially loads a head portion of the musical score data.

The musical score data written to the FIFO memory 31 are constituted by note data and rest data respectively having prescribed data configurations, examples of which are shown in FIG. 3. That is, the note data of one word is constituted by an octave code (Oct), a note code (Note), a part number designating a part for locating a note, an interval representing a time length measured from one note to the next note (or next rest), and note length information. The rest data of one word is constituted by a rest code representing the type of a rest, a part number designating a part for locating the rest, and an interval representing a time length measured from one rest to the next note (or next rest).

In order to reproduce musical tones by the sound source 35, the aforementioned note data and rest data are sequentially read from the FIFO memory 31, so that a vacant area emerges and is increased in size in proportion to the amount of data being read out. Initially, the FIFO memory 31 stores only the head portion of the musical score data that consist of thirty-two words, so that following portions of the musical score data are sequentially written to the vacant area of the FIFO memory 31. Thus, even though the musical score data contain numerous data elements that realize high-quality reproduction of musical tones, the present embodiment is capable of adequately reproducing the musical score data of a high quality by sequentially writing following portions of the musical score data to the FIFO memory 31.

The music playback section 15 performs reproduction of music data based on the aforementioned operating principle. In reproduction, it sets in advance the prescribed size (namely, the prescribed number of words) of a vacant area that emerges in the FIFO memory 31 to initiate a write operation of writing the next portion of the musical score data. That is, IRQ Point data is set in advance to designate the number of words as the size of a vacant area that initiates a write operation of writing the next portion of the musical score data to the FIFO memory 31. By setting the IRQ Point data, the FIFO memory 31 issues an interrupt request signal (IRQ) to instruct the system CPU 10 to proceed to the writing operation of writing the next portion of the musical score data. When the IRQ Point data is set close to zero word, the interruption frequency will be increased; however, the processing load of the system CPU 10 can be reduced because it is possible to decrease the number of words for writing the musical score data in each interruption. In contrast, when the IRQ Point data is set close to thirty-two words, the interruption frequency will be reduced; however, the processing load of the system CPU 10 is increased because of the increased number of words for writing the musical score data in each interruption. For this reason, it is preferable to set the IRQ Point data in consideration of the processing speed of the system CPU 10.

When the system CPU 10 issues a start instruction to the music playback section 15 to start reproduction of music data, the sequencer 33 supplies read pulses (Read) to the FIFO memory 31, from which musical score data are being sequentially read. When note data shown in FIG. 3 is read from the FIFO memory 31, an octave code, a note code, part information, and key-on data are set to the sound source 35 in connection with the timing based on interval information and tempo information that is set in advance, wherein the octave code and note code are used to designate a tone pitch. In response to the aforementioned codes and information, the sound source 35 proceeds to generation of a musical tone signal representing a musical tone having the designated tone pitch in accordance with the tone color parameter that is set to the part. After a lapse of the time length corresponding to the note length of the note data, the sequencer 33 supplies key-off data to the sound source 35 while designating the part. Hence, the sound source 35 proceeds to a mute operation of the musical tone corresponding to the note data. The aforementioned operations are repeatedly performed every time note data is read from the FIFO memory 31. Thus, the sound source 35 sequentially generates musical tone signals, which are reproduced from the musical score data and are forwarded to the digital-to-analog converter 36.

In the progression of the reproduction of the musical score data, when the present size of a vacant area that emerges in the FIFO memory 31 matches the prescribed number of words that is set by the IRQ Point data, the FIFO memory 31 issues an interrupt request signal (IRQ) to the system CPU 10. Upon receipt of the IRQ, the system CPU 10 reads the next portion of the musical score data that correspond to (31-IRQ Point) words, which are sent onto the bus 24. The next portion of the musical score data is transferred and written to the vacant area of the FIFO memory 31 via the interface 30.

By repeatedly writing following portions of the musical score data each corresponding to (31-IRQ Point) words, it is possible to complete writing operations entirely over the musical score data into the limited storage of the FIFO memory 31 even though the musical score data contain numerous data corresponding to a single musical tune.

The sound source 35 reproduces the musical score data read from the FIFO memory 31 in accordance with the preset tempo. As described above, the present embodiment is capable of reproducing the musical score data, which contain numerous data to realize high-quality reproduction of the musical tune, by using the FIFO memory 31 whose storage is limited to thirty-two words, for example.

Suppose that the user makes the prescribed setup on the portable telephone 1 to allow playback of a musical tune in response to an incoming call by the music playback section 15. At reception of an incoming call on the portable telephone 1, the music playback section 15 performs music playback processes so that the speaker 23 produces musical tones of the musical tune based on the output of the digital-to-analog converter 36 as incoming call sound. Suppose that the user makes the prescribed setup on the portable telephone 1 to allow playback of a musical tune by the music playback section 15 when the user holds the portable telephone 1 for a while. That is, when the user holds the portable telephone 1, the music playback section 15 performs music playback processes so that the speaker 22 produces musical tones of the musical tune based on the output of the digital-to-analog converter 36 as hold sound. At the same time, the sound source 35 outputs to the speech processor 14 musical tone signals that are used for transmission of the hold sound to the telephone terminal of a certain person who is communicating with the user of the portable telephone 1. Thus, the musical tone signals are transmitted to the telephone terminal by means of the communicator 13 of the portable telephone 1.

Next, a description will be given with respect to an example of an incoming call reception process, which is executed by the system CPU 10 of the portable telephone 1 in accordance with the present embodiment, with reference to a flowchart of FIG. 6. Herein, the description is made under the precondition that the user operates keys on the operator input section 17 to designate an incoming call melody mode that enables the portable telephone 1 to reproduce the melody of a musical tune as incoming call sound to notify the user of reception of incoming calls. In addition, the musical tune whose melody is to be produced as incoming call sound is selected in advance from multiple musical tunes on the basis of prescribed rules, so that music data of the selected musical tune is precedently transferred from the system RAM 11 or system ROM 12 to the FIFO memory 31 and Voice RAM 34 of the music playback section 15.

The system CPU 10 initiates an incoming call reception process upon reception of incoming call signals that are transmitted to the portable telephone 1 by radio communication. In step 100, the system CPU 10 detects an incoming call melody mode in which the portable telephone 1 receives incoming call signals transmitted from the telephone terminal of a calling party. In addition, telephone number information is informed from the telephone terminal of the calling party and is stored in the system RAM 11. In step 101, a decision is made as to whether or not the user presses a certain key to designate the incoming call melody mode on the operator input section 17. In other words, a decision is made as to whether or not the portable telephone 1 is set such that the music playback section 15 reproduces musical tones of the musical tune as incoming call sound. The system CPU 10 makes the aforementioned decision with reference to the setup data that are stored in the system RAM 11 in advance.

When the system CPU 10 determines in step 101 that the user designates the incoming call melody mode for the portable telephone 1, the flow proceeds to step 102 in which a decision is made as to whether or not a cache hit event occurs. It was described before that the music data of the musical tune whose melody is to be reproduced as incoming call sound are precedently written to the music playback section 15, specifically, the musical score data are precedently written to the FIFO memory 31 while the tone color data are precedently written to the Voice RAM 34. Therefore, the system CPU 10 detects a cache hit when the music data precedently written to the music playback section 15 match the music data that are specified by the telephone number information of the telephone terminal of the calling party.

The aforementioned decision regarding the cache hit is made with reference to a table that is stored in the system RAM 11 to show relationships in correspondence between telephone numbers of certain persons, who may be likely to call the user of the portable telephone 1, and musical tune specifying data for specifying musical tunes that may be likely to be reproduced by the music playback section 15. Using the telephone number of the calling party as key information, the system CPU 10 retrieves musical tune specifying data for specifying a musical tune that should be reproduced by the music playback section 15. Then, the system CPU 10 compares the retrieved musical tune specifying data with musical tune specifying data that are stored in the system RAM 11 and specify music data precedently cached in the music playback section 15. Thus, the system CPU 10 makes the decision regarding the cache hit by detecting whether the retrieved musical tune specifying data matches the musical tune specifying data for specifying the cached music data.

When the system CPU 10 determines in step 102 that a cache hit is detected, the flow proceeds to step 103 to start reproduction of incoming call melody sound. That is, the sound source 35 generates musical tone signals representing musical tones of multiple parts based on tone-generation parameters given from the sequencer 33, so that the speaker 23 produces musical tones as incoming call melody sound. If the system CPU 10 fails to detect a cache hit in step 102, the flow proceeds to step 104 in which initialization is performed on music data for use in production of incoming call melody sound.

In the initialization, the system CPU 10 instantaneously erases the music data precedently stored in the FIFO memory 31 and Voice RAM 34. With reference to the table showing relationships in correspondence between telephone numbers of certain persons, who may be likely to call the user of the portable telephone 1, and musical tune specifying data for specifying musical tunes that may be likely to be reproduced by the music playback section 15, the system CPU 10 newly specifies a musical tune whose melody is to be reproduced on the basis of the telephone number of the calling party. Music data of the specified musical tune are transferred from the system RAM 11 or system ROM 12 to the FIFO memory 31 and Voice RAM 34. Thus, the system CPU 10 completes the initialization of the music data with respect to the music playback section 15. After completion of the initialization in step 104, the flow proceeds to step 103 in which the system CPU 10 starts reproduction of incoming call melody sound corresponding to the musical tune that is newly specified in response to the telephone number of the calling party.

When the system CPU 10 determines in step 101 that the user does not designate an incoming call melody mode on the portable telephone 1, the flow proceeds to step 105 in which the sound source 35 generates signals representing standard incoming call sound such as beep sound, so that the speaker 23 produces the standard incoming call sound to notify the user of reception of an incoming call from the calling party. Incidentally, the user is allowed to set the portable telephone 1 to activate the vibrator 19 to generate vibration, which is substituted for the standard incoming call sound.

After completion of the step 103 or 105, the flow proceeds to step 106 in which a decision is made as to whether or not the user operates a conversation key on the operator input section 17 to proceed to line connection with the telephone terminal of the calling party. When the line connection is established, the flow proceeds to step 107. Herein, the decision step 106 is repeatedly performed until the user operates the conversation key so that the portable telephone 1 continuously rings incoming call sound. In step 107, the system CPU 10 stops generation of incoming call melody sound or standard incoming call sound that is rung by the portable telephone 1.

In step 108, the system CPU 10 proceeds to a conversation process to allow a conversation conducted between the user of the portable telephone 1 and the calling party of the telephone terminal. In step 109, a decision is made as to whether or not the line is disconnected. The decision is realized by detecting whether or not the user presses a stop key to stop the conversation. When the system CPU 10 determines in step 109 that the line is not disconnected, the flow returns back to the step 108 to continue the conversation between the user and the calling party. When the system CPU 10 determines in step 109 that the line is disconnected, the flow proceeds to step 110 to proceed to a cache process of music data, which is performed in preparation for a next music playback event. In the cache process, a musical tune that may be likely to be reproduced in response to a next incoming call is selected from among preset musical tunes in accordance with prescribed rules, so that the music data of the selected musical tune are precedently transferred from the system RAM 11 or system ROM 12 to the FIFO memory 31 and Voice RAM 34 of the music playback section 15.

The prescribed rules are described to select a single musical tune from among plural musical tunes stored in advance, so that the music data of the selected musical tune for use in reproduction are precedently written to the music playback section 15. It is possible to employ various types of rules that are implemented by the system CPU 10 to select a single musical tune from among plural musical tunes. In accordance with a first type of rules, for example, the system CPU 10 selects a musical tune that is used most frequently in the past. In accordance with a second type of rules, the system CPU 10 repeatedly selects the same musical tune that was precedently used.

Next, other examples of incoming call reception processes executed by the system CPU 10 of the portable telephone 1 will be described with reference to flowcharts shown in FIGS. 7 and 8. The description is made under the precondition that the user operates a hold key on the operator input section 17 to designate a hold melody mode in which a melody of a musical tune is reproduced as hold sound in response to reception of an incoming call. In addition, the musical tune whose melody is to be reproduced as hold sound is selected from among plural musical tunes in accordance with prescribed rules, so that the music data of the selected musical tune are precedently transferred from the system RAM 11 or system ROM 12 to the FIFO memory 31 and Voice RAM 34 of the music playback section 15.

Figure 7:
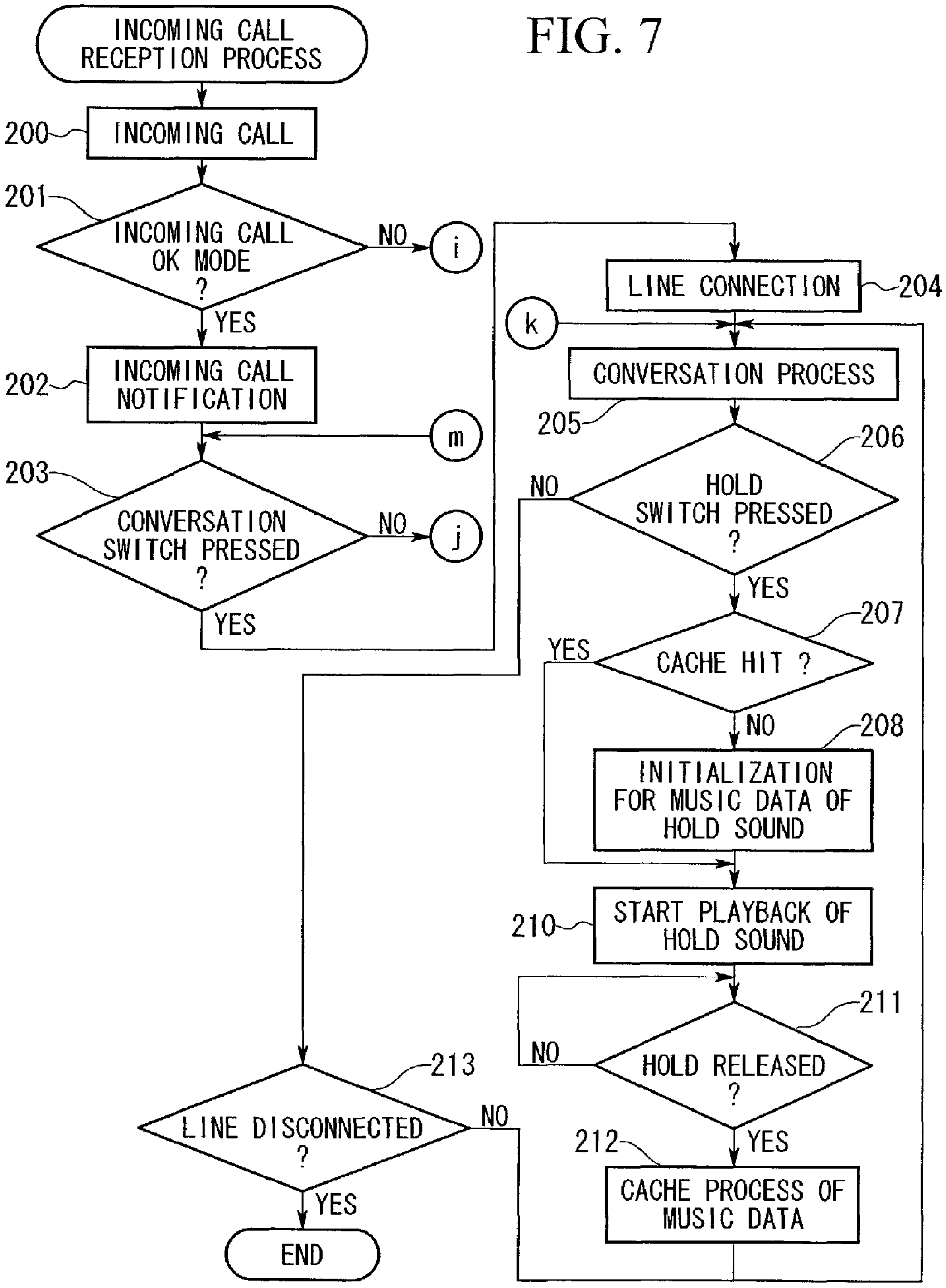
FIG. 7 is a flowchart fragmentarily showing another example of an incoming call reception process executed by the system CPU.
Figure 8:
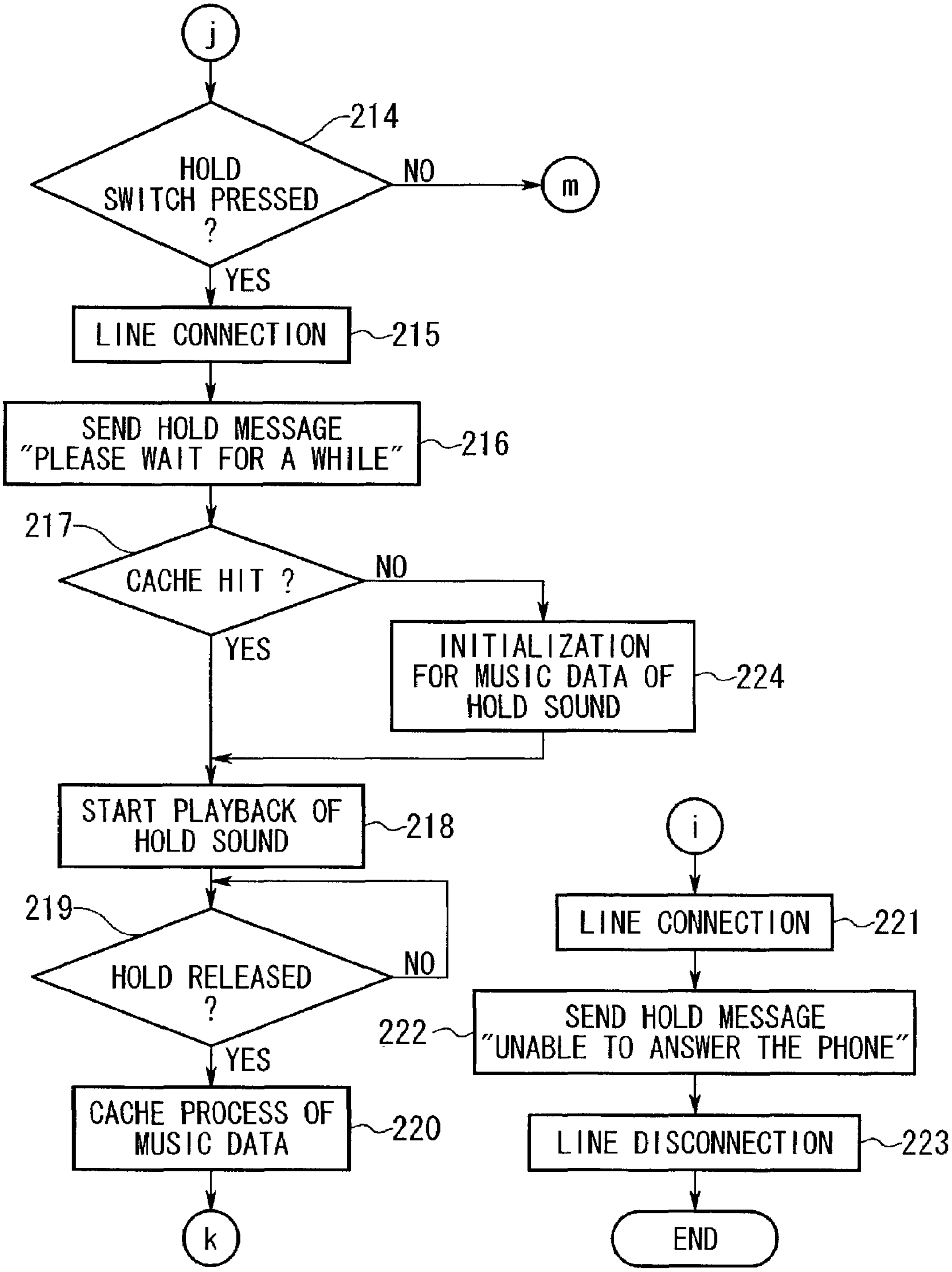
FIG. 8 is a flowchart fragmentarily showing a remaining part of the incoming call reception process shown in FIG. 7.

The system CPU 10 starts executing an incoming call reception process of FIGS. 7 and 8 in response to reception of incoming call signals that are transmitted from the telephone terminal of a calling party to the portable telephone 1. That is, in step 200, the system CPU 10 detects reception of an incoming call from the telephone terminal whose telephone number information is transmitted to the portable telephone 1. The telephone number information given from the telephone terminal of the calling party is stored in the system RAM 11. In step 201, a decision is made as to whether or not the portable telephone 1 is set in an incoming call OK mode. The incoming call OK mode is an operation mode in which the portable telephone 1 is ready to accept an incoming call from the calling party. This mode is provided in consideration of the busy situation where the user is now driving a car and is incapable of answering the phone, or the user is now attending an important meeting in his/her company and is reluctant to answer the phone. The system CPU 10 makes the decision of step 201 with reference to setup data that are stored in the system RAM 11 in advance.

When the system CPU 10 determines in step 201 that the portable telephone 1 is now set in the incoming call OK mode, the portable telephone 1 proceeds to incoming call notification in step 202. That is, the sound source 35 reproduces standard incoming call sound such as beep sound, which is produced by the speaker 23. Alternatively, the system CPU 10 activates the vibrator 19 to generate vibration, which is substituted for incoming call sound. Incidentally, it is possible to modify the step 202 such that the portable telephone 1 produces incoming call melody sound to notify the user of reception of an incoming call as shown in FIG. 6. In step 203, a decision is made as to whether or not the user presses a conversation key on the operator input section 17. When the system CPU 10 detects in step 203 that the user presses the conversation key, the system CPU 10 establishes a line connection with the telephone terminal of the calling party in step 204, and then it proceeds to a conversation process in step 205.

In step 206, a decision is made as to whether or not the user operates a hold key on the operator input section 17. When the system CPU 10 determines in step 206 that the user does not operate the hold key, the flow proceeds to step 213 in which a decision is made as to whether or not a line is disconnected, in other words, a decision is made as to whether or not the user operates a stop key. When the system CPU 10 determines in step 213 that the line is not disconnected, the flow returns to step 205 again so that the system CPU 10 continuously executes the conversation process. When the system CPU 10 detects in step 213 that the line is disconnected, it ends the incoming call reception process of FIG. 7.

When the system CPU 10 detects in step 206 that the user operates the hold key, the flow proceeds to step 207 in which a decision is made as to whether or not a cache hit occurs. As described before, the music data corresponding to the musical tune whose melody is to be reproduced as hold sound are precedently written to the music playback section 15, specifically, the musical score data are written to the FIFO memory 31 while the tone color data are written to the Voice RAM 34. Therefore, the system CPU 10 makes a decision in step 207 as to whether or not the music data precedently written to the music playback section 15 match the music data that are specified by the telephone number information given from the telephone terminal of the calling party.

The aforementioned decision of the step 207 is made with reference to the table that is stored in the system RAM 11 to indicate relationships in correspondence between musical tune specifying data for specifying musical tunes, which may be likely to be reproduced by the music playback section 15, and telephone numbers of persons who may be likely to call the user of the portable telephone 1. Using the telephone number of the calling party as key information, the system CPU 10 retrieves musical tune specifying data for specifying a musical tune that should be reproduced by the music playback section 15. Then, the system CPU 10 compares the retrieved musical tune specifying data with musical tune specifying data that are stored in the system RAM 11 and specify the music data precedently cached in the music playback section 15. Thus, the system CPU 10 makes a decision regarding a cache hit by detecting whether the retrieved musical tune specifying data match the musical tune specifying data for specifying the cached music data.

When the system CPU 10 detects a cache hit in step 207, the flow proceeds to step 210 in which the music playback section 15 starts reproduction of the melody of the cached musical tune as hold sound. That is, the sound source 35 reproduces musical tone signals for respective parts of the musical tune based on tone-generation parameters given from the sequencer 33 as hold sound. Thus, the speaker 22 produces musical tones of musical tone signals reproduced by the sound source 35. In addition, the musical tone signals are transmitted to the telephone terminal to produce hold sound to notify the calling party of an intermission that the user holds the portable telephone 1 for a while to temporarily stop the conversation. When the system CPU 10 determines in step 207 that a cache hit does not occur, the flow proceeds to step 208 in which initialization is made on music data for use in generation of hold sound.

In the initialization, the system CPU 10 instantaneously erases the music data stored in the FIFO memory 31 and Voice RAM 34 of the music playback section 15. With reference to the table which is stored in the system RAM 11 to show relationships in correspondence between musical tune specifying data for specifying musical tunes reproduced by the music playback section 15 and telephone numbers of persons listed in advance, the system CPU 10 specifies a musical tune on the basis of the telephone number of the calling party, so that the music data of the specified musical tune are transferred from the system RAM 11 or system ROM 12 to the FIFO memory 31 and Voice RAM 34 of the music playback section 15. Thus, the system CPU 10 completes the initialization on the music data representing the musical tune whose melody is to be reproduced as hold sound. After completion of the initialization in step 208, the flow proceeds to step 210 in which the music playback section 15 starts reproduction of hold melody sound.

In step 211, a decision is made as to whether a hold condition is released or not. That is, the system CPU 10 makes a decision as to whether or not the user operates a hold release key on the operator input section 17 with reference to the setup information that is stored in the system RAM 11. When the system CPU 10 detects in step 211 that the hold condition is released, the flow proceeds to step 212 in which the system CPU 10 proceeds to a cache process of music data. In the cache process, a musical tune is selected for preparation of a next music playback event in accordance with prescribed rules, so that the music data of the selected musical tune are transferred from the system RAM 11 or system ROM 12 to the FIFO memory 31 and Voice RAM 34 of the music playback section 15.

In accordance with prescribed rules, a single musical tune is selected from among plural musical tunes that are stored in advance in the system RAM 11 or system ROM 12 so that the music data of the selected musical tune are precedently written to the music playback section 15. It is possible to describe the rules such that the musical tune that is used most frequently in the past is to be selected first, or it is possible to describe the rules such that a musical tune that is precedently used is to be selected again. After completion of the cache process of the music data in step 212, the flow returns to step 205 again so that the portable telephone 1 restarts the conversation process. Thereafter, the system CPU 10 performs the foregoing operations.

When the system CPU 10 determines in step 201 that the portable telephone 1 is not set in the incoming call OK mode, the flow proceeds to step 221 shown in FIG. 8 in which the portable telephone 1 establishes a line connection with the telephone terminal of the calling party. In step 222, the portable telephone transmits to the telephone terminal of the calling party a hold voice message that the user is now unable to answer the phone. Such a hold voice message is sent to the telephone terminal by means of the speech processor 14 and communicator 13. In step 223, the portable telephone 1 automatically disconnects the line with the telephone terminal, and then it ends the incoming call reception process.

When the system CPU 10 determines in step 203 that the user does not operate the conversation key, the flow proceeds to step 214 shown in FIG. 8 in which a decision is made as to whether or not the user operates the hold key on the operator input section 17. When the system CPU 10 determines in step 214 that the user does not operate the hold key, the flow proceeds to step 230 shown in FIG. 7. Thus, the system CPU 10 repeats the steps 203 and 214 until the user operates either the conversation key or hold key.

When the system CPU 10 detects in step 214 that the user operates the hold key, the flow proceeds to step 215 in which a line connection is established. In step 216, the system CPU 10 proceeds to reproduction of a hold voice message of "please wait for a while". Such a hold voice message is transmitted to the telephone terminal of the calling party by means of the speech processor 14 and communicator 13.

Then, the system CPU 10 proceeds to steps 217 to 220, which are identical to the aforementioned steps 207 to 212 shown in FIG. 7. Details of the steps 217 to 220 are omitted to avoid duplicate description. After the portable telephone 1 completes transmission of the hold voice message in step 216, when the system CPU 10 detects a cache hit in step 217, the flow proceeds to step 218. In addition, when the system CPU 10 fails to detect a cache hit in step 217 so that the system CPU 10 performs initialization of music data with respect to hold sound in step 224, the flow proceeds to step 218. In step 218, the music playback section 15 starts reproduction of the music data regarding the hold sound. Then, when the hold condition is released in step 219, the flow proceeds to step 220 in which the system CPU 10 performs a cache process of music data. After completion of the step 220, the flow returns to step 205 shown in FIG. 7. Thus, the system CPU 10 performs the foregoing conversation process by the established line connection.

Figure 9:
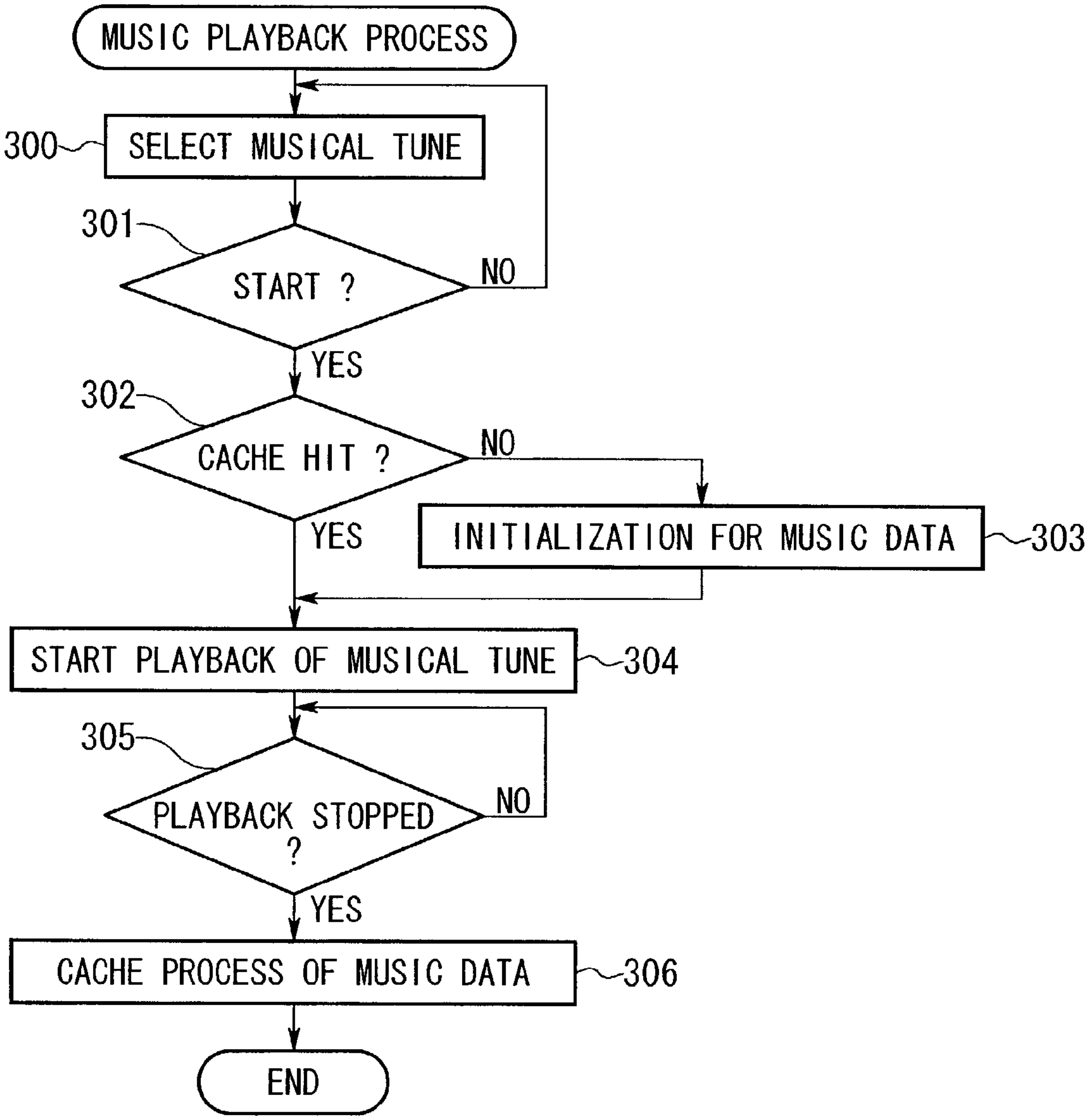
FIG. 9 is a flowchart showing a music playback process executed by the system CPU.

Next, a music playback process executed by the system CPU 10 of the portable telephone 1 will be described in detail with reference to FIG. 9. The music playback process is provided for the user to listen to the musical tune that is played back, regardless of conversation on the portable telephone 1. In addition, the music playback process provides so-called background music (BGM) that is played back softly during conversation in progress. That is, the user operates a prescribed key on the operator input section 17 to designate the music playback process to be started. In a music playback mode, the flow firstly proceeds to step 300 that allows the user of the portable telephone 1 to select a musical tune from among plural musical tunes which are listed in advance.

In response to the music playback mode, a music playback menu is displayed on the screen of the display 18 of the portable telephone 1, wherein the user designates a music selection menu providing plural musical tunes. That is, the user operates dial buttons (or numeric keys) on the operator input section 17 to select a desired musical tune from among plural musical tunes. In response to selection of the desired musical tune on the screen of the display 18, the corresponding music data are selected from among plural music data stored in the system RAM 11 and system ROM 12. Herein, the system ROM 12 stores music data representing preset musical tunes that are preinstalled in the portable telephone 1. The system RAM 11 is capable of storing music data representing other musical tunes that are downloaded from the music download center or the external device 20. In step 301, the system CPU 10 makes a decision whether to start playback of the musical tune. That is, a decision is made as to whether or not the user operates a start key on the operator input section 17 to start playback of the musical tune.

When the system CPU 10 determines in step 301 that the user does not instruct the portable telephone 1 to start playback of the musical tune, the flow returns to step 300. When the system CPU 10 detects in step 301 that the user instructs the portable telephone 1 to start playback of the musical tune, the flow proceeds to step 302 in which a decision is made as to whether a cache hit occurs or not. It was described before that the prescribed music data are precedently written to the music playback section 15, specifically, the musical score data are written to the FIFO memory 31 while the tone color data are written to the Voice RAM 34. Therefore, the system CPU 10 makes a decision as to whether or not the selected musical tune in step 300 matches the prescribed music data that was precedently written to the music playback section 15.

The aforementioned decision is made with reference to the musical tune specifying data that are stored in the system RAM 11 to specify musical tunes. That is, the system CPU 10 determines whether or not the musical tune specifying data for specifying the selected musical tune in step 300 match the musical tune specifying data for specifying the musical tune precedently cached in the music playback section 15.

When the system CPU 10 detects a cache hit in step 302, the flow proceeds to step 304 in which the music playback section 15 starts playback of the musical tune, which is selected by the user in step 300 and is precedently cached in the music playback section 15. That is, the sound source 35 reproduces musical tone signals of respective parts of the musical tune based on tone-generation parameters given from the sequencer 33. Thus, the speaker 22 or 23 produces musical tones corresponding to reproduced musical tone signals. When the system CPU 10 fails to detect a cache hit in step 302, the flow proceeds to step 303 in which the system CPU 10 performs initialization of music data for playback.

In the initialization, the system CPU 10 instantaneously erases the music data that are previously stored in the FIFO memory 31 and Voice RAM 34 of the music playback section 15. With reference to the table on the system RAM 11 showing a list of musical tunes that may be likely to be played back by the music playback section 15, the music data of the selected musical tune in step 300 are transferred from the system RAM 11 or system ROM 12 to the FIFO memory 31 and Voice RAM 34. This completes the initialization by which new and desired music data are set to the music playback section 15. After completion of the step 303, the flow proceeds to step 304 in which the music playback section 15 starts playback of the musical tune.

In step 305, a decision is made as to whether or not the playback of the musical tune is stopped. In other words, a decision is made as to whether or not the user operates a stop key on the operator input section 17 to stop the playback of the musical tune. The aforementioned decision is made with reference to the setup data that are stored in the system RAM 11 in advance. When the system CPU 10 detects in step 305 that the playback of the musical tune is stopped, the flow proceeds to step 306 in which the system CPU 10 performs a cache process of music data. Then, the system CPU 10 ends the music playback process of FIG. 9. In the cache process of step 306, a musical tune that may be likely to be played back is selected for preparation of a next music playback event in accordance with prescribed rules, so that the music data of the selected musical tune are transferred from the system RAM 11 or system ROM 12 to the FIFO memory 31 and Voice RAM 34.

Figure 6:
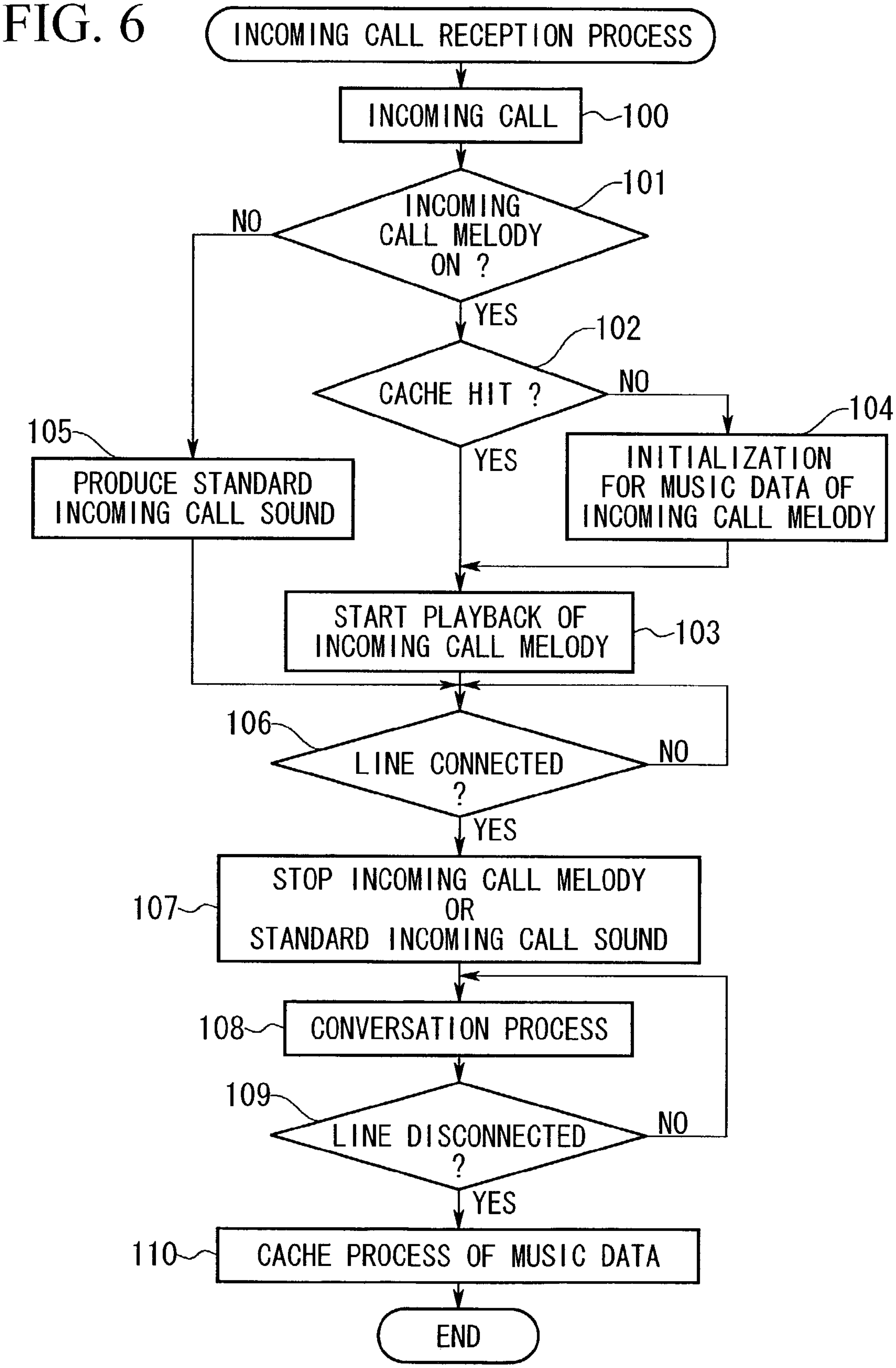
FIG. 6 is a flowchart showing an example of an incoming call reception process executed by a system CPU shown in FIGS. 1 and 2.

The prescribed rules have been already described in conjunction with the flowcharts shown in FIGS. 6 to 8. That is, the prescribed rules are described such that a single musical tune will be selected from among plural musical tunes which are listed in advance to realize the precedent write operation of music data which may be likely to be reproduced. Herein, it is possible to describe the rules such that a musical tune which is used most frequently in the past is to be selected first, or it is possible to describe the rules such that a musical tune which is precedently used is selected again. Incidentally, it is possible to describe the rules in various manners to adequately and precedently write user's preset music data to the music playback section 15.

As described heretofore, the present embodiment has a variety of technical features, which will be summarized below.

In the portable telephone 1 of the present embodiment, prior to reproduction of music, a certain musical tune is automatically selected in accordance with prescribed rules, so that the music data of the selected musical tune are transferred from a first storage (i.e., system RAM 11 or system ROM 12) to a second storage (i.e., FIFO memory 31 and Voice RAM 34). That is, a musical tune that has a high likelihood to be used for reproduction in the next music playback event is precedently cached in the second storage. When the system CPU 10 detects a cache hit in which the musical tune presently specified for reproduction matches the cached musical tune, it reads the music data of the cashed musical tune from the second storage without accessing the first storage. This eliminates a necessity in that music data be newly written to the second storage in a cache hit event. Thus, it is possible to eliminate a time lag between the timing of a trigger for designating reproduction of a melody to specify the music data and the reproduction timing of actually reproducing the melody.

When the system CPU 10 does not detect a cache hit because the musical tune presently specified for reproduction does not match the cached musical tune precedently stored in the second storage, it instantaneously erases the stored content of the second storage. In addition, the music data of the specified musical tune are newly transferred from the first storage to the second storage. Thus, it is possible to reliably reproduce the specified musical tune without interruption.

The present embodiment employs the prescribed rules for automatically selecting a musical tune that may be likely to be reproduced in the next music playback event from among plural musical tunes listed in advance in the first storage, so that the music data of the selected musical tune are precedently transferred from the first storage to the second storage. In addition, the present embodiment describes the rules such as to select a musical tune that is used most frequently in the past. This increases a probability in that the musical tune specified for reproduction matches the musical tune which is selected and precedently cached in the second storage. Thus, it is possible to reduce a time lag between the timing of a trigger for designating reproduction of a melody to specify music data and the reproduction timing of actually reproducing the melody.

Lastly, this invention is not necessarily limited to the embodiment described heretofore, hence, it is possible to modify the embodiment in various manners within the scope of the invention without departing from essential subject matters. That is, the present embodiment is designed in such a manner that the FIFO memory 31 and Voice memory 34 are used as a cache memory for storing only a single musical tune. However, it is possible to provide plural cache memories for respectively storing plural musical tunes, e.g., seven or eight musical tunes. In this case, one of the cache memories is selected in response to the telephone number regarding an incoming call, so that a desired musical tune is to be read from the selected cache memory. Alternatively, it is possible to provide a single cache memory having a large storage capacity that can be divided into plural areas. In this case, one of the areas of the cache memory is selected in response to the telephone number regarding an incoming call, so that a desired musical tune is to be read from the selected area of the cache memory.

What is claimed is:

1. A portable telephone having a music playback device for reproducing a melody that is stored in advance, comprising:

a first storage, external to the music playback device, for storing a plurality of music data representing of a plurality of musical tunes;

a second storage, installed in the music playback device, for storing a part of the music data representing a single musical tune to be reproduced;

a musical tone generator, installed in the music playback device, for generating musical tone signals based on the music data input thereto;

a monitor, installed in the music playback device for monitoring a vacant area of the second storage and for issuing a music data transfer request when the vacant area matches a prescribed size; and a control device, external to the music playback device, for selecting single music data from among the plurality of music data in accordance with prescribed rules prior to melody playback, in which a part of the selected music data counted from its top portion is transferred from the first storage to the second storage in advance, and in which upon receipt of the music data transfer request from the monitor during the melody playback, a following part of the music data is read from the first storage and is transferred to the second storage, wherein when the musical tune presently specified for playback matches the musical tone previously written in the second storage, the control device proceeds to the melody playback based on the music data stored in the second storage, and when the musical tune presently specified for playback does not match the musical tune previously written in the second storage, the control device transfers a part of the presently specified musical tune counted from its top portion from the first storage to the second storage and then proceeds to the melody playback.

2. A portable telephone according to claim 1, wherein when the musical tune presently specified for playback does not match the selected musical tune previously written to the second storage, the control device automatically transfers music data of the presently specified musical tune from the first storage to the second storage.

3. A portable telephone according to claim 1, wherein the prescribed rules are configured to select a musical tune that is used most frequently in the past.

4. A portable telephone according to claim 1, wherein the music data of the musical tune correspond to incoming call sound or hold sound of the portable telephone.

5. A portable telephone according to claim 1, wherein in accordance with the prescribed rules, music data previously used by the musical tone generator are selected and are stored in the second storage.

6. A music playback method for a portable telephone having a melody reproduction function that includes a music playback device for reproducing a melody stored in advance and that comprises a first storage, external to the music playback device for storing a plurality of music data representing a plurality of musical tunes, a second storage, installed in the music playback device for storing a part of the music data representing a single musical tune to be reproduced, and a musical tone generator, installed in the music playback device, for generating musical tone signals based on the music data input thereto, said music playback method comprising:

monitoring a vacant area of the second storage; and selecting single musical data from among the plurality of musical data in accordance with prescribed rules prior to melody playback, in which a part of the selected music data counted from its top portion is transferred from the first storage to the second storage in advance, and in which upon receipt of the music data transfer request from a monitor during the melody playback, a following part of the music data is read from the first storage and is transferred to the second storage, wherein when a musical tune presently specified for playback matches the musical tune previously written in the second storage, reading and outputting the music data stored in the second storage to the musical tone generator; and when the vacant area of a prescribed size emerges in the second storage, issuing a music data transfer request to read a prescribed amount of music data from the first storage and to write them to the vacant area of the second storage.

7. A music playback method according to claim 6, wherein when the musical tune presently specified for reproduction does not match the musical tune previously written to the second storage, automatically transferring music data of the presently specified musical tune counted from its top portion from the first storage to the second storage.

8. A music playback method according to claim 6, wherein the prescribed rules are configured to select a musical tune that is used most frequently in the past.

9. A portable telephone comprising:

a first storage for storing a plurality of music data representing a plurality of musical tunes that are listed in advance in connection with preset telephone numbers regarding incoming calls;

a second storage for storing a part of the music data representing a single musical tune to be reproduced;

a controller for selecting single music data from among the plurality of music data in accordance with prescribed rules prior to melody playback, in which a part of the selected music data counted from its top portion is transferred from the first storage to the second storage in advance, and in which upon receipt of the music data transfer request from the monitor during the melody playback, a following part of the music data is read from the first storage and is transferred to the second storage;

a musical tone generator for generating musical tone signals based on the music data stored in the second storage, when the musical tune previously written in the second storage is specified by a telephone number regarding an incoming call; and a monitor for monitoring a vacant area of the second storage, wherein when the monitor detects that the vacant area of a prescribed size emerges in the second storage, the controller reads from the first storage the prescribed music data, which are stored in the vacant area of the second storage.

10. A portable telephone according to claim 9, wherein when the telephone number of the incoming call specifies a musical tune that differs from the selected musical tune previously written to the second storage, the controller automatically transfers music data of the specified musical tune from the first storage to the second storage.

11. A portable telephone according to claim 9, wherein the prescribed rules are configured to select a musical tune that is used most frequently in the past.

12. A portable telephone according to claim 9, wherein the prescribed rules are configured to repeatedly select a previously used musical tune.

13. A portable telephone according to claim 9, wherein the music data of the musical tune correspond to incoming call sound or hold sound of the portable telephone.

14. A portable telephone comprising:

a first storage for storing music data of a plurality of musical tunes that are listed in advance in connection with preset telephone numbers regarding incoming calls;

a second storage having a capacity of storing a part of the music data representing a single musical tune to be reproduced;

a controller for selecting a musical tune having a possibility of being reproduced from among the plurality of musical tunes in accordance with prescribed rules, so that music data of the selected musical tune are transferred in advance from the first storage to the second storage;

a musical tone generator for when the musical tune previously written to the second storage is specified by a telephone number regarding an incoming call, generating musical tone signals based on the music data stored in the second storage; and a monitor for monitoring a vacant area within the second storage, wherein when the monitor detects that the vacant area of a prescribed size emerges in the second storage, the controller reads from the first storage the prescribed music data, which are stored in the vacant area of the second storage, and the second storage comprises a FIFO memory for storing musical score data within the music data of the selected musical tune, and a Voice RAM for storing tone color data for a plurality of parts of the selected musical tune.

15. A portable telephone according to claim 14, wherein when the telephone number of the incoming call specifies a musical tune that differs from the selected musical tune previously written to the second storage, the controller automatically transfers music data of the specified musical tune from the first storage to the second storage.

16. A portable telephone according to claim 14, wherein the prescribed rules are configured to select a musical tune that is used most frequently in the past.

17. A portable telephone according to claim 14, wherein the prescribed rules are configured to repeatedly select a previously used musical tune.

18. A music playback device for melody playback installed in a portable telephone wherein a plurality of music data representing musical tunes are stored in a system memory that is installed in the portable telephone and is used to store its internal data so that prescribed music data are read from the system memory to enable playback of a musical tune, said music playback device comprising:

a cache memory having a capacity of storing a part of the music data representing a single musical tune to be reproduced;

a musical tone generator for generating musical tones based on the music data;

a monitor for monitoring a vacant area of the cache memory and issuing a music data transfer request when the vacant area matches a prescribed size; and a controller for selecting single music data from among the plurality of music data stored in the system memory in accordance with prescribed rules prior to melody playback, so that the selected music data are transferred in advance from the system memory to the cache memory, wherein when the musical tune presently specified for playback matches the musical tune of the music data stored in the cache memory, the controller directly reads from the cache memory the music data, which are output to the musical tone generator, and when the vacant area of a prescribed size emerges in the cache memory, the monitor communicates a music data transfer request to the controller, which in turn reads from the system memory the music data, which are stored in the vacant area of the cache memory.

19. A music playback device according to claim 18, wherein the music data of the musical tune correspond to incoming call sound or hold sound of the portable telephone.

20. A music playback device according to claim 18, wherein in accordance with the prescribed rules, the music data previously used by the musical tone generator are selected and are stored in the cache memory.

* * * * *